United States Patent

[11] 3,603,742

[72] Inventor Eduard Schuller
Berlin, Germany
[21] Appl. No. 802,858
[22] Filed Feb. 27, 1969
[45] Patented Sept. 7, 1971
[73] Assignee Telefunken Patentverwertungs G.m.b.H.
Ulm (Danube), Germany
[32] Priority Feb. 29, 1968
[33] Germany
[31] P 15 74 491.9

[54] REPRODUCING SYSTEM UTILIZING ROUND FLEXIBLE MAGNETIZABLE RECORDING CARRIER FOILS
19 Claims, 6 Drawing Figs.

[52] U.S. Cl. 179/100.2 P, 340/174.1 E, 346/137
[51] Int. Cl. G11b 5/60, G11b 5/82, G01d 15/28
[50] Field of Search 179/100.2 P, 100.2 A, 100.3 V; 340/174.1 E; 274/41.4; 346/137

[56] References Cited
UNITED STATES PATENTS

| | | | |
|---|---|---|---|
| 1,366,617 | 1/1921 | Wier et al. | 179/100.2 |
| 2,296,872 | 9/1942 | Proctor | 346/137 |
| 2,950,353 | 8/1960 | Fomenko | 179/100.2 |
| 3,226,701 | 12/1965 | Masson | 340/174.1 |
| 3,369,227 | 2/1968 | Boissevain | 179/100.2 |
| 3,488,646 | 1/1970 | Sugaya et al. | 179/100.2 |

FOREIGN PATENTS

| | | | |
|---|---|---|---|
| B22,549 | 3/1956 | Germany | 179/100.2 |
| 1,119,186 | 4/1956 | France | |

*Primary Examiner*—Bernard Konick
*Assistant Examiner*—J. Russell Goudeau
*Attorney*—Spencer & Kaye

ABSTRACT: A reproducing system'for recording or playback of the type in which a stationary plate is mounted beneath a rotating round flexible foil type record and the stationary plate is formed with an upwardly arched surface with an elongated crest which, when the record is at rest, underlies a diameter of the record. Transducer means which may be either means for placing recording indicia on the carrier, or means for forming playback signals from indicia previously recorded on the carrier are mounted along a line overlying said crest. The air pressure between the record and the arched surface is reduced by air currents generated during rotation of the record This draws the flexible record into a stiffened curved position relative to the plate, and thus better positions the record relative to the transducer means.

INVENTOR
Eduard Schüller
BY Spencer & Kaye
ATTORNEYS

REPRODUCING SYSTEM UTILIZING ROUND FLEXIBLE MAGNETIZABLE RECORDING CARRIER FOILS

BACKGROUND OF THE INVENTION

1. Field of the Invention

This invention relates to reproducing systems utilizing flexible disc records formed of foil, and more particularly to an arrangement for more precisely positioning the record relative to the recording or playback device during operation.

2. Description of the Prior Art

Flexible synthetic foil records with a magnetizable coating are sometimes used for recording and/or playback of signals, particularly video signals or pulse-shaped signals. The foils are held during rotation at their center and stabilize at relatively high speeds due to the centrifugal forces developed so that the required geometric position between the magnetic layer and the magnetic heads can be established without the foil having to rest on a rotating turntable.

It is also known to have such foils rotate slightly above a stationary stabilization plate, so that a cushion is formed by the air flowing outwardly between the stabilization plate and the foil, which cushion maintains the foil at a certain distance from the stabilization plate and the magnetic heads inserted therein.

It has been shown, however, that the known arrangements effect only insufficient stabilization, particularly when the foil possesses dents, creases or other unevennesses caused by the manufacturing process or improper handling. These unevennesses lead to momentary signal interruptions which can have a very disturbing effect in calculating processes or in the television picture reproduction.

SUMMARY OF THE INVENTION

It is an object of the present invention to provide apparatus which improves the fidelity of reproduction in a system utilizing foil disc records.

It is a further object of the invention to provide such apparatus which more precisely holds such records in a desired position during recording and playback, and which better compensates for dents, creases, and other unevenness in the disc.

Briefly stated these and other objects are accompanied by providing a recording and/or playback instrument on which rapidly moving, round, flexible records, float during operations on a cushion of air and rotate above a stationary stabilization plate. Interfering unevennesses in the foil are eliminated, according to the present invention, in that the stabilization plate is provided with an upwardly arched surface having an elongated crest which coincides with the diameter of the recording carrier foil and wherein recording or scanning, respectively, is accomplished by a reproducing arrangement disposed along the crest of the curvature.

DESCRIPTION OF THE PREFERRED EMBODIMENTS

Figure 1:
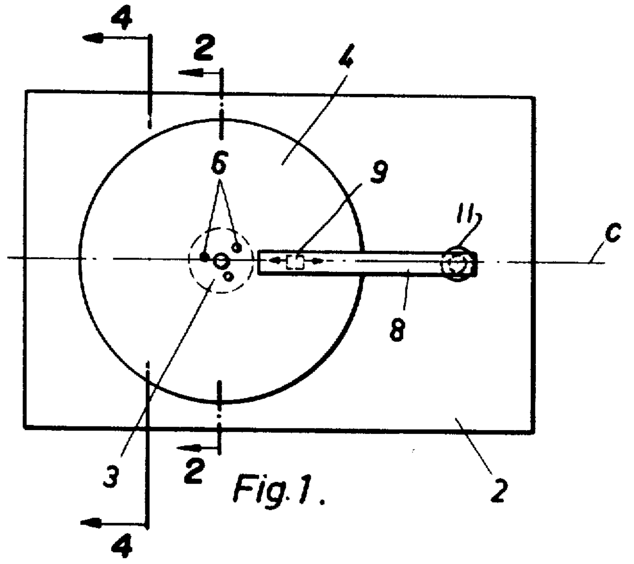
FIG. 1 is a plan view which illustrates in a schematic fashion one embodiment of the present invention.
Figure 2:
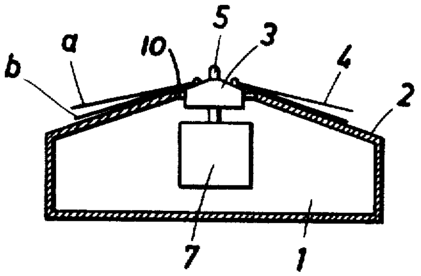
FIG. 2 is a sectional view on the line 2—2 of FIG. 1.
Figure 4A:
FIG. 4*a* is a sectional view of another embodiment of the invention utilizing a stabilization plate having a cylindrical surface, and taken along a line similar to 4—4 of FIG. 1.
Figure 4C:
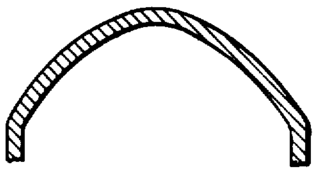
FIG. 4*c* is a sectional view of another embodiment of the invention utilizing a stabilization plate having a hyperbolic surface, and taken along a line similar to 4—4 of FIG. 1.
Figure 4B:
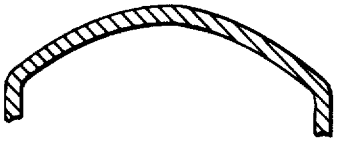
FIG. 4*b* is a sectional view of another embodiment of the invention utilizing a stabilization plate having a parabolic surface, and taken along a line similar to 4—4 of FIG. 1.

A housing 1 is provided on its upper side with a curved plate 2. The curvature of plate 2 may be cylindrical, hyperbolic or parabolic as shown in FIGS. 4*a* to 4*c*. It may, however, also be formed with inclined plane surfaces as shown in FIG. 2 by bending a sheet at an angle with a sufficiently large angle of curvature. In each case the plate has an elongated crest C, and the surface has a constant cross section along planes perpendicular to crest line C. The plate 2 preferably consists of aluminum whose upper surface is polished.

A mounting or clamping piece 3 for a round recording carrier foil 4 of a flexible material is inserted into an opening in the plate which is located on the crest line 2 of the curved surface of plate 2, and is symmetric thereto. The surface of the mounting piece 3 is adapted to the bending radius of plate 2. The upper side of the mounting piece 3 contains means for mounting the record and for clamping it for rotation above the plate. These means are indicated in the form of a center prong 5 and three follower pins 6. The mounting piece can be caused to rapidly rotate by means of a drive motor 7. During this rapid rotation, air flows spirally outward through a gap 10 between the mounting piece 3 and plate 2 and thence in the space between the foil and the stabilization plate. The farther outward the air advances, the higher will be its speed. The cross section required for the stream of air must thus become smaller and the pressure is reduced. Therefore, the foil is pulled closer and closer to the plate with increasing radius and an equilibrium is produced between the external air pressure and the air pressure in the space between the plate and the foil so that the foil, which in its rest position (*a* in FIG. 2) is hanging loosely, is stabilized. The stabilization forces generated by the air pressure are so high that the foil is also pulled against the heavily curved stabilization plate and is maintained in this position (*b* in FIG. 2). The dimensions of gap 10 are so selected that an appropriate amount of air passes through the space between carrier 4 and plate 2. This stabilization which is insufficient with a plane support when cracks, dents or mechanical stresses are present in the foil, is thus improved because the foil is additionally stiffened by the curvature at the critical point at which it is being scanned. This curvature is stationary with reference to the instrument, but movable with reference to the foil. In effect a stiffened crest curve diameter line rotates about the record. Consequently a transducer arrangement 9 is attached to a stationary arm 8 in such a manner that it is disposed at the crest of the curvature. The stiffening in the crest line C has the effect that the respective scanning point is almost absolutely immovable.

The geometric relation between the transducer and the foil can be produced by a height adjustment mechanism 11 of the transducer or of the arm; it is, however, also possible to have air flow in measured amounts from the center of the plate so that the air pressure between the foil and the stabilization plate and thus the spacing between foil and transducer may be regulated. This additional flow or air may occur through the gap 10 between plate 2 and mounting piece 3 and thus is produced without additional manufacturing steps.

When employing a foil grooved in the shape of an Archimedes spiral, the transducer arrangement is mounted in the arm 8 to be displaceable in the direction of the crest line C of the curvature. When using ungrooved foils the radial displacement of the converter arrangement may occur in the conventional manner via a spindle guide or the like.

Figure 3:
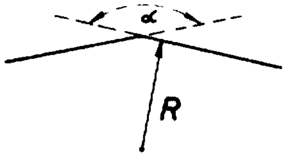
FIG. 3 is a diagram illustrating several geometric dimensions of the stabilization surface.

In constructing operative embodiments of the invention, it has been found to be satisfactory, for example, to dimension the radius of curvature R of plate 2 at the crest line to measure about 450 mm. for a foil thickness of 0.13 mm. The angle $\alpha$, about which the foil is bent, also depends on the thickness of the foil and is about 168° in the above-mentioned example. The dimensions R and $\alpha$ are illustrated in FIG. 3.

In general, the thicker the foil or the slower the rotational speed, the greater should be the radius of curvature, and the dimensions of the air gap 10.

It should be understood that the above description of the present application is susceptible to various changes, modifications and adaptations. It should be noted that in the specification and in the following claims, the terms "transducer means," "elements," or "arrangements," is used so as to be generic to both recording processes and playback means, elements or arrangements.

I claim:

1. A method of rotating a flexible foil-type record past a transducer in the operation of a recording and/or playback device comprising the steps of:

disposing the record adjacent a stationary stabilizing plate which is arched toward the record and which has an elongated crest coextensive with a diameter of the record;

providing a passage for the introduction of air between the plate and the record;

disposing a transducer adjacent the record and in line with the crest of the plate; and rotating the record about its center adjacent the plate at a high speed for causing the rotation of the record relative to the plate to induce a flow of air from the passage between the plate and the record away from the center of the record sufficient to form an air cushion which underlies every point of the record beyond its center to maintain the record spaced from the plate and from any solid body extending from the plate, and which causes the record to assume a configuration closely conforming to the configuration of the plate, whereby the record position is stabilized and the record is rigidified along the plate crest.

2. A method as defined in claim 1 wherein said step of rotating is carried out to rotate the record at a speed which causes the resulting air flow to bring the periphery of the record along a diameter normal to the plate crest at least as close to the plate as any other point of the record which is on such diameter and which is spaced inwardly from such periphery.

3. A recording and/or playback device for use with a flexible foil type record which is rotated at high speed, comprising, in combination:

a. rotatable drive means for engaging the record substantially at its center to cause the record to rotate therewith;

b. a stationary stabilizing plate arranged to underlie the record, and said plate being arched upwardly and having an elongated crest which extends along the entirety of a diameter of the record;

c. means defining a passage for the introduction of air between said plate and the record;

d. transducer means for coacting with the record;

e. means supporting said transducer means for movement relative to the record along a line adjacent and parallel to said crest;

f. means for rotating said rotatable means together with the record at a speed which causes the rotation of the record to induce a flow of air from the passage, between the record and said plate, and away from the center of the record, sufficient to form an air cushion which underlies every point of the record beyond its center to maintain the record spaced from the plate and from any solid body present between the plate and the record, and which causes the record to assume a configuration closely conforming to the configuration of said plate, whereby the record position is stabilized relative to said plate and the record is rigidified along the plate crest.

4. The apparatus of claim 3 in which said transducer means is a recording means for placing signal producing indicia on the record.

5. The apparatus of claim 3 in which said transducer means is scanner means for sensing signal producing indicia on the record, and producing playback signals in response thereto.

6. The apparatus of claim 3 in which said transducer means includes a stationary arm mounted on the support means, a transducer element, and means mounting the transducer element for movement on the stationary arm along the said elongated crest line.

7. The improvement of claim 3 including means for adjusting the height of said transducer means.

8. The improvement of claim 3 in which said stabilization plate is formed with an opening of dimensions selected to control the amount of air flowing between the record and said plate and thereby control the spacing between the record and said transducer means.

9. An arrangement as defined in claim 3 wherein said means defining a passage are positioned for disposing such passage close to said drive means.

10. The apparatus of claim 3 in which the arched portion of the stationary plate is constituted by two inclined sections meeting at said elongated crest.

11. The apparatus of claim 10 in which the region of the crest in which said inclined surfaces meet is curved.

12. For use with a foil-type record having a thickness of about 0.13 mm., the apparatus of claim 10 in which said inclined sections are joined by a curved section having a radius of curvature of approximately 450 mm.

13. An arrangement as defined in claim 3 wherein the region between said plate and the position to be occupied by the record is free of any solid body.

14. An arrangement as defined in claim 13 further comprising a flexible foil-type record disposed above said plate and engaged at its center by said rotatable drive means, and wherein said means for rotating rotates said record at such speed.

15. An arrangement as defined in claim 14 wherein the speed at which said record is being rotated is sufficient to produce an air flow which causes the periphery of said record along a diameter normal to the crest to be at least as close to said plate as is any other point of the record which is on such diameter and which is spaced inwardly from such periphery.

16. The apparatus of claim 3 in which the arched portion of the stationary plate is curved.

17. The apparatus of claim 16 in which said curve is cylindrical.

18. The apparatus of claim 16 in which said curve is hyperbolic.

19. The apparatus of claim 16 in which said curve is parabolic.

UNITED STATES PATENT OFFICE
CERTIFICATE OF CORRECTION

Patent No. 3,603,742 Dated September 7th, 1971

Inventor(s) Eduard Schüller

It is certified that error appears in the above-identified patent and that said Letters Patent are hereby corrected as shown below:

In the heading of the patent, line 6, change "Patentverivertungs" to --Patentverwertungs--. Column 1, line 47, change "accompanied" to --accomplished--. Column 2, line 57, change "or" to --of--.

Signed and sealed this 21st day of March 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334